United States Patent
Reis et al.

(10) Patent No.: US 8,943,134 B2
(45) Date of Patent: Jan. 27, 2015

(54) TARGETING BASED ON SOCIAL UPDATES

(75) Inventors: Davi Reis, Belo Horizonte (BR); Felipe Goldstein, Neuilly-sur-Seine (FR); Francisco G. Matos, Belo Horizonte (BR); Frederico Quintao, Belo Horizonte (BR)

(73) Assignee: Google Inc., Mountain View, CA (US)

( * ) Notice: Subject to any disclaimer, the term of this patent is extended or adjusted under 35 U.S.C. 154(b) by 493 days.

(21) Appl. No.: 13/339,293

(22) Filed: Dec. 28, 2011

(65) Prior Publication Data

US 2012/0166540 A1 Jun. 28, 2012

Related U.S. Application Data

(60) Provisional application No. 61/427,531, filed on Dec. 28, 2010.

(51) Int. Cl.
*G06F 15/16* (2006.01)
*G06Q 30/02* (2012.01)
*G06Q 30/08* (2012.01)

(52) U.S. Cl.
CPC ........ *G06Q 30/0241* (2013.01); *G06Q 30/0201* (2013.01); *G06Q 30/0269* (2013.01); *G06Q 30/08* (2013.01)
USPC ........... 709/204; 709/207; 709/218; 370/260; 707/770; 715/759

(58) Field of Classification Search
CPC .............. G06Q 10/10; G06Q 30/0241; G06Q 30/0201; G06Q 30/0269; G06Q 30/08; H04L 29/08072; H04L 29/06
USPC ........................................................ 709/204
See application file for complete search history.

(56) References Cited

U.S. PATENT DOCUMENTS

| | | | |
|---|---|---|---|
| 7,558,829 | B1 | 7/2009 | Perlman et al. |
| 7,665,107 | B2 | 2/2010 | Goodman et al. |
| 7,774,229 | B1 | 8/2010 | Dernehl et al. |

(Continued)

FOREIGN PATENT DOCUMENTS

| | | |
|---|---|---|
| EP | 1 463 008 | 9/2004 |
| JP | 2002-052148 | 2/2002 |

(Continued)

OTHER PUBLICATIONS

Authorized officer Chung Keun Lee, International Search Report and Written Opinion in PCT/US2011/067668, mailed Jul. 9, 2012, 10 pages.

(Continued)

*Primary Examiner* — Jude Jean Gilles
*Assistant Examiner* — Jaren M Means
(74) *Attorney, Agent, or Firm* — Fish & Richardson P.C.

(57) ABSTRACT

Methods, systems, and apparatus, including computer programs encoded on a computer-readable storage medium, are described for providing content to a user. A method comprises: receiving an update for publication to an activity stream associated with the user, the activity stream being produced by a social application executing on one or more server computers and being published for consumption by one or more subscribers to the social application that have been designated by the user as being authorized to receive the update; and distributing additional content to the user based on the received user update.

32 Claims, 5 Drawing Sheets

(56) References Cited

U.S. PATENT DOCUMENTS

| | | | |
|---|---|---|---|
| 7,824,268 B2 | 11/2010 | Harvey et al. | |
| 7,828,661 B1 | 11/2010 | Fish et al. | |
| 7,941,535 B2 | 5/2011 | Sherrets et al. | |
| 8,167,717 B2 | 5/2012 | Kato et al. | |
| 8,172,687 B2 | 5/2012 | Gagner et al. | |
| 8,180,680 B2 | 5/2012 | Leventhal | |
| 8,285,837 B2 | 10/2012 | Sanford et al. | |
| 8,355,955 B1 | 1/2013 | Mirchandani et al. | |
| 8,398,490 B1 | 3/2013 | Phelon et al. | |
| 8,402,548 B1* | 3/2013 | Muriello et al. | 726/26 |
| 2003/0081000 A1 | 5/2003 | Watanabe et al. | |
| 2004/0030651 A1 | 2/2004 | Kim et al. | |
| 2004/0125133 A1 | 7/2004 | Pea et al. | |
| 2004/0125148 A1 | 7/2004 | Pea et al. | |
| 2004/0189699 A1 | 9/2004 | Dobronsky et al. | |
| 2004/0229684 A1 | 11/2004 | Blackburn et al. | |
| 2004/0235563 A1 | 11/2004 | Blackburn et al. | |
| 2005/0060353 A1 | 3/2005 | Tan et al. | |
| 2005/0086109 A1 | 4/2005 | McFadden et al. | |
| 2005/0216338 A1 | 9/2005 | Tseng et al. | |
| 2005/0256866 A1 | 11/2005 | Lu et al. | |
| 2006/0253781 A1 | 11/2006 | Pea et al. | |
| 2007/0073574 A1 | 3/2007 | Young, Jr. | |
| 2007/0282675 A1 | 12/2007 | Varghese | |
| 2008/0052156 A1 | 2/2008 | Brenner | |
| 2008/0139301 A1 | 6/2008 | Holthe | |
| 2008/0147482 A1 | 6/2008 | Messing et al. | |
| 2008/0176658 A1 | 7/2008 | Wright | |
| 2008/0189174 A1 | 8/2008 | Moore | |
| 2008/0195546 A1 | 8/2008 | Lilley | |
| 2008/0195956 A1 | 8/2008 | Baron et al. | |
| 2008/0256233 A1 | 10/2008 | Hall et al. | |
| 2009/0048922 A1 | 2/2009 | Morgenstern | |
| 2009/0063463 A1 | 3/2009 | Turner et al. | |
| 2009/0070219 A1* | 3/2009 | D'Angelo et al. | 705/14 |
| 2009/0093292 A1 | 4/2009 | Randhawa | |
| 2009/0119167 A1 | 5/2009 | Kendall et al. | |
| 2009/0144392 A1* | 6/2009 | Wang et al. | 709/217 |
| 2009/0164462 A1 | 6/2009 | Snijder | |
| 2009/0187825 A1 | 7/2009 | Sandquist et al. | |
| 2009/0210270 A1 | 8/2009 | Quan et al. | |
| 2009/0216620 A1 | 8/2009 | Lee | |
| 2009/0222315 A1 | 9/2009 | Hayes, Jr. | |
| 2009/0248516 A1* | 10/2009 | Gross | 705/14 |
| 2009/0292608 A1 | 11/2009 | Polachek | |
| 2009/0319359 A1* | 12/2009 | Soza et al. | 705/14.25 |
| 2009/0319378 A1 | 12/2009 | Sinyagin et al. | |
| 2009/0327855 A1 | 12/2009 | Le | |
| 2010/0088157 A1 | 4/2010 | Wilson | |
| 2010/0106782 A1 | 4/2010 | Huang et al. | |
| 2010/0138491 A1 | 6/2010 | Churchill et al. | |
| 2010/0217645 A1 | 8/2010 | Jin et al. | |
| 2010/0228582 A1* | 9/2010 | King et al. | 705/7 |
| 2010/0318611 A1 | 12/2010 | Curtin et al. | |
| 2010/0325557 A1 | 12/2010 | Sibillo | |
| 2011/0092282 A1 | 4/2011 | Gary | |
| 2011/0093334 A1 | 4/2011 | Wood | |
| 2011/0153421 A1 | 6/2011 | Novikov et al. | |
| 2011/0231240 A1 | 9/2011 | Schoen et al. | |
| 2011/0258535 A1 | 10/2011 | Adler et al. | |
| 2011/0276396 A1 | 11/2011 | Rathod | |
| 2011/0281648 A1 | 11/2011 | Weising | |
| 2011/0320250 A1 | 12/2011 | Gemmell et al. | |
| 2012/0015722 A1 | 1/2012 | Mooney et al. | |
| 2012/0108306 A1 | 5/2012 | Munsell et al. | |
| 2012/0109737 A1 | 5/2012 | Setty et al. | |
| 2012/0116867 A1 | 5/2012 | Reis et al. | |
| 2012/0116871 A1 | 5/2012 | Reis et al. | |
| 2012/0150971 A1 | 6/2012 | Bahrainwala et al. | |
| 2012/0151383 A1 | 6/2012 | Kazan et al. | |
| 2012/0220377 A1 | 8/2012 | Cantor | |
| 2012/0225721 A1 | 9/2012 | Holder et al. | |
| 2012/0290308 A1 | 11/2012 | Detwiller et al. | |
| 2013/0029766 A1 | 1/2013 | Wickett et al. | |
| 2013/0047104 A1 | 2/2013 | Chen | |
| 2013/0066706 A1 | 3/2013 | Wu et al. | |
| 2013/0080526 A1 | 3/2013 | Gill et al. | |
| 2013/0091013 A1 | 4/2013 | Wang et al. | |
| 2013/0124322 A1 | 5/2013 | Boland et al. | |

FOREIGN PATENT DOCUMENTS

| | | |
|---|---|---|
| JP | 2002-133262 | 5/2002 |
| KR | 10-2008-0053692 | 6/2008 |
| WO | 01/23976 A2 | 4/2001 |
| WO | 2007/041371 | 4/2007 |

OTHER PUBLICATIONS

Li, et al. (2010) "Keyword Extraction for Social Snippets," [online] [Retrieved on Dec. 12, 2011]; Retrieved from the Internet URL: http://www.cs.uiuc.edu/~hanj/pdf/www10_zli.pdf, 2 pages.

Authorized officer Kyoung Hee Hong, International Search Report and Written Opinion in PCT/US2011/059389, mailed May 21, 2012, 9 pages.

Authorized officer Philippe Bécamel, International Preliminary Report on Patentability in PCT/US2011/059389, mailed May 16, 2013, 6 pages.

Office Action issued in U.S. Appl. No. 12/940,849 on Apr. 9, 2012, 28 pages.

Office Action issued in U.S. Appl. No. 12/940,849 on Nov. 19, 2012, 34 pages.

Office Action issued in U.S. Appl. No. 12/940,849 on May 30, 2014, 32 pages.

Office Action issued in U.S. Appl. No. 13/289,842 on Apr. 6, 2012, 32 pages.

Office Action issued in U.S. Appl. No. 13/289,842 on Oct. 25, 2012, 38 pages.

Office Action issued in U.S. Appl. No. 13/289,842 on Jun. 2, 2014, 36 pages.

Office Action issued in U.S. Appl. No. 13/303,761 on Mar. 20, 2013, 12 pages.

Office Action issued in U.S. Appl. No. 13/303,761 on Oct. 23, 2013, 17 pages.

Office Action issued in U.S. Appl. No. 13/303,761 on Mar. 18, 2014, 10 pages.

* cited by examiner

TARGETING BASED ON SOCIAL UPDATES

CROSS-REFERENCE TO RELATED APPLICATION

This application claims priority to U.S. Provisional Application No. 61/427,531, filed on Dec. 28, 2010. The disclosure of the prior application is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements ("ads"). In turn, an auction can be performed and the advertisement slots can be allocated to advertisers according, among other things, to their bids and/or the relevance of the advertisement to content presented on a page hosting the slot or a request that is received for the advertisement.

SUMMARY

In general, one innovative aspect of the subject matter described in this specification can be implemented in methods that include a method for targeting content. The method comprises: receiving an update for publication to an activity stream associated with a user, the activity stream being produced by a social application executing on one or more server computers and being published for consumption by one or more subscribers to the social application that have been designated by the user as being authorized to receive the update; and targeting additional content to the user based on the received user update.

These and other implementations can each optionally include one or more of the following features. The activity stream can be a stream produced by a social application. The update can include content for publication in the activity stream. Targeting can include targeting additional content based on the content for publication. Targeting can include targeting additional content to one or more of the subscribers. Targeting can include targeting advertisements to serve to the user in one or more contexts. The one or more contexts can include a context within a social application and a context outside of a social application that received the user update. The update can be a comment by a user on content exposed to the user by the social application, a comment posted by the user on a blog, an interaction with a content item in a user's activity stream, a designation of an advertisement for re-publication by the user, or a designation that a user likes or dislikes certain content. The method can further comprise: (a) receiving an indication from the user to publish the update to an individual or group designated by the user; (b) determining information to be included in an annotation to be published along with the update, the annotation including customized information related to a user or a group associated with the user that is to be presented along with the update; and (c) providing the update to the individual or group including providing the annotation along with the update. The annotation can include a control for re-publishing the update by a recipient. The method can further comprise receiving user input selecting the control and designating the update for re-publishing, and re-publishing the update. The method can further comprise targeting additional content to the user or a group associated with the user based on the received indication. The method can further comprise tracking designations to whom a user re-publishes updates to and targeting additional content to the user or group associated with the user based on the tracking The method can further comprise tracking designations for how often a user re-publishes updates and targeting additional content to the user or group associated with the user based on the tracking. The method can further comprise tracking where a user is located or a time of designation for designations to re-publish an update and targeting additional content to the user or group associated with the user based on the tracking The method can further comprise tracking a context associated with a user when making a designation to re-publish an update and targeting additional content to the user or group associated with the user based on the tracking. The method can further comprise tracking whom a user designates updates to be re-published to so as to infer relationships between the user and the designatees and targeting additional content to the user or group associated with the user based on the tracking The user's group can be a social circle. The group can be a social circle, family, friends, work groups, or some other particularly identified group. The control can enable a user to re-publish the update along with a message. Targeting can include using the update as a signal when determining relevant content to be provided to the user in the future. The method can further comprise determining one or more social signals for use in affecting a quality score that is used to evaluate content to be provided to the user where the one or more social signals are based at least in part on the user update. The method can further comprise determining one or more social signals based at least in part on the user update and using the social signals when determining content for presentation to the user. The one or more social signals can be used to categorize the user as belonging to a group. The one or more social signals can be used to customize annotations to be included with the updates that are re-published by the user. The one or more social signals can be used to determine whether a system that re-publishes content should re-publish other content to the user. The one or more social signals can be used to surface the user to an advertiser.

In general, another aspect of the subject matter described in this specification can be implemented in methods that include a method for targeting content. The method includes: receiving an update for publication as part of an update posting for a user in a social context, where the social context is related to a social application executing on one or more servers, the social application including a presence associated with the user for providing updates about the user to one or more subscribers; and targeting additional content to the user based on the received user update.

In general, another aspect of the subject matter described in this specification can be implemented in computer program products that include a computer program product tangibly embodied in a computer-readable storage device. The computer program product can include instructions that, when executed by a processor, cause the processor to: receive an update for publication to an activity stream associated with a user, the activity stream being produced by a social application executing on one or more server computers and being published for consumption by one or more subscribers to the social application that have been designated by the user as being authorized to receive the update; and target additional content to the user based on the received user update.

In general, another aspect of the subject matter described in this specification can be implemented in systems. A system includes a social application, one or more server computers, and a content management system. The social application is configured to execute on the one or more server computers and is configured to produce an activity stream associated with a user and to publish the activity stream for consumption by one or more subscribers to the social application that have been designated by the user as being authorized to receive updates to the activity stream. The content management system is configured to receive an update for publication to the activity stream and to target additional content to the user based on the received user update.

Particular implementations may realize none, one or more of the following advantages. For example, targeting content to a user based on a user posting an update to an activity stream can result in the user receiving content in which they have an interest. A user who may be interested in an advertiser's product or services can be surfaced to an advertiser.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An update for publication can be received from a user as part of an update posting for a user in a social context. The social context can be related to a social application. Update postings for a user can be propagated to subscribers who the user has authorized to receive the update. In some implementations, an update can be posted to an activity stream. An update can be, for example, a comment by a user, an interaction with an activity stream content item, a designation that the user likes or dislikes content, or a designation of an ad for re-publishing. Based on the received update, additional content can be targeted to the user. For example, ads can be targeted to the user, such as within the social application, or in a context outside of the social application, such as in an ad slot included in a third party web page.

In some examples, activity streams, as provided by social networking web sites and applications, allow a user to publish user updates and make the updates accessible or viewable by designates. For example, a user can publish messages, photos, or other content to his activity stream, and share the content with individuals, family, friends, or other groups. Alternatively, the user's publication of content can be to a presence associated with the user in a social environment. In another example, the publication can be to a subscriber to the updates. In some implementations, the publication can be to an area that is designated for providing updated content for the user (e.g., a wall or social profile page). Other mechanisms are possible for providing the publication medium.

Figure 1:
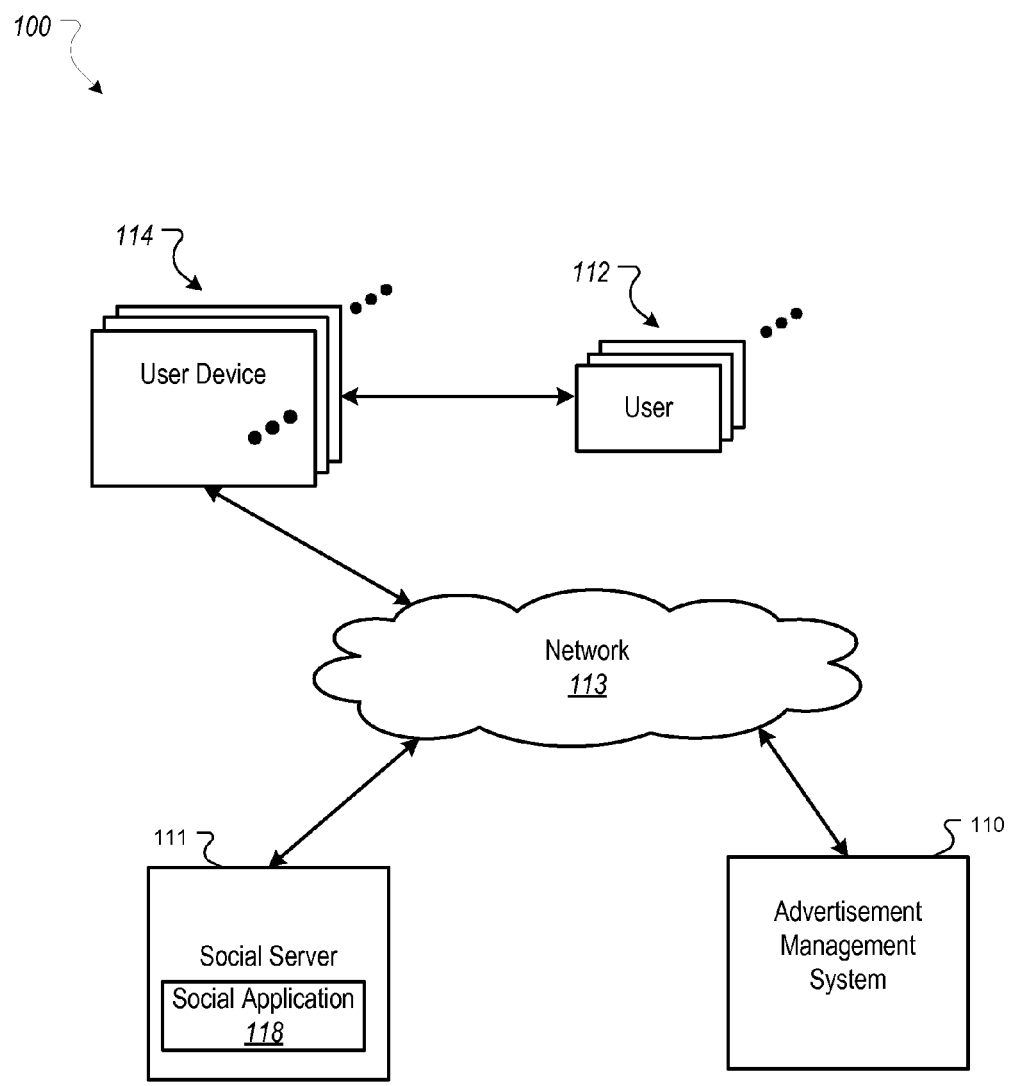
FIG. 1 is a block diagram of an example social environment.

FIG. 1 is a block diagram of an example social environment 100. The example social environment 100 includes an ad management system 110 that manages advertising services and one or more social server systems 111 that allow users 112 to interact with other users 112 within a social framework. The example social environment 100 includes a network 113, such as a local area network (LAN), a wide area network (WAN), the Internet, or a combination thereof. The network 113 connects user devices 114, the ad management system 110, and the social server system 111. The example social environment 100 may include many thousands of user devices 114.

A user device 114 is an electronic device that is under control of a user 112 and is capable of requesting and receiving resources over the network 113. Example user devices 114 include personal computers, mobile communication devices (e.g., smartphones), and other devices that can send and receive data over the network 113. A user device 114 typically includes one or more user applications, such as a web browser, to facilitate the sending and receiving of data over the network 113.

The user 112 can be, for example, an individual or an organization. The social server system 111 provides a presence for each user 112 in the social environment 100. For example, the social server system 111 can provide one or more social applications 118 to the user 112. The social application 118 can allow the user 112 to share information in a social network. For example, the social application 118 can be a social networking website that users can use to identify friends and social groups (e.g., circles), send and receive email, post messages and multi-media (e.g. photos, video, audio), track social events, provide updates and so on.

The user 112 can use the social application 118 to post an update for the user 112 in a social context. The social server system 111 can, in response to the update, provide the update to one or more subscribers that the user 112 has authorized to receive the update. For example, subscribers may be subscribed to an activity stream associated with the user 112, and may be enabled to view the update in the user's activity stream. An activity stream, which may be provided by the social server system 111 for each user 112, can show recent updates posted by the user 112.

The update can be, for example, a comment by the user 112 on content exposed to the user 112 by the social application 118, such as a content item posted to their activity stream or to another user's activity stream, or some other content. As another example, the update can be a comment posted by the user 112 on a blog. As yet another example, the update can be a designation that the user 112 likes, approves, supports, prefers or dislikes certain content. The user 112 can, for example, designate that they like or dislike a content item posted to their activity stream or to another user's activity stream, or some other content. An update can also be some other type of interaction with a content item in a user's activity stream, such as a designation to share or re-publish the content item.

An update can also be a designation by the user 112 to re-publish an ad (e.g., an ad provided by the ad management system 110). For example, the user 112 can designate to re-publish an ad included in an ad slot of a third-party web page or a search results web page. When designating the ad for re-publication, the user can provide an indication to publish the ad to an individual or to one or more groups designated by the user 112, such as to post the re-published ad to an activity stream associated with a recipient. The ad and the re-published ad may each include a custom annotation which can include a message indicating recent activity related to the ad, and a control which can be used to re-publish the ad. A first user 112, for example, can, while viewing the ad on a search results page, select the control to re-publish the ad to an activity stream, and a second user 112, upon viewing the ad in the activity stream, can select the control to re-publish the ad to a potentially different set of recipients.

In response to an update posted by the user 112, additional information can be targeted to the user 112. For example, targeting can be based on the content (e.g., textual content) of the update. Targeting can include, for example, targeting one or more ads to the user 112 or to one or more subscribers designated to receive the update. Ads can be selected, for example, for display to the user 112 in association with the social application 118, or for display in a context outside of the social application 118. For example, one or more ads can be selected for display in one or more ad slots included in a third-party web page.

The ad management system 110 can receive a request for ads to be provided. The request for ads can include characteristics of ad slots that are defined for an ad destination, and can be provided to the ad management system 110. For example, a size of the ad slot, and/or media types that are available for presentation in the ad slot can be provided to the ad management system 110. Similarly, keywords associated with the content of the update of the user 112 can also be provided to the ad management system 110 to facilitate identification of relevant ads. Based on data included in the request for ads, the ad management system 110 can select ads that are eligible to be provided in response to the request.

For situations in which the systems discussed here collect personal information about users, the users 112 may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user 112, or a user's geographic location may be generalized where location information is obtained (such as to a city, zip code, or state level), so that a particular location of the user 112 cannot be determined.

Figure 2:
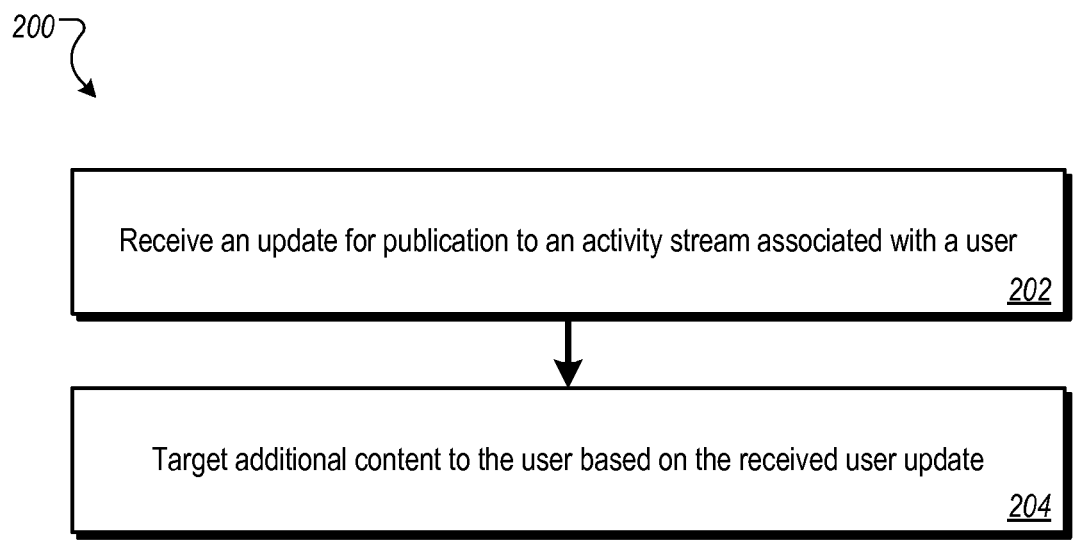
FIG. 2 is a flowchart of an example process for targeting content to a user based on a social update posted to an activity stream.

FIG. 2 is a flowchart of an example process 200 for targeting content to a user based on a social update posted to an activity stream. The process 200 can be performed, for example, by the ad management system 110 and/or by the social server system 111 described above with respect to FIG. 1.

An update for publication to an activity stream associated with a user is received (202). The activity stream can be produced, for example, by a social application executing on one or more server computers and can be published for consumption by one or more subscribers to the social application that have been designated by the user as being authorized to receive the update. The update can be a comment by a user on content exposed to the user by the social application, a comment posted by the user on a blog, an interaction with a content item in a user's activity stream, a designation of an advertisement for re-publication by the user, or a designation that a user approves, supports, likes or dislikes certain content, to name a few examples.

The update can include content for publication in an activity stream, where the content can include textual content and/or multi-media content (e.g., audio, image, video). The activity stream can be provided by the social application.

An indication can be received from the user to publish the update to an individual or group designated by the user. For example, the user may use a control to designate the update for publishing and to select one or more recipients of the update. A recipient can be, for example, one or more individuals and/or one or more groups such as a social circle, family, friends, work groups, or any other particularly identified group. The control can be included, for example, in an annotation that is displayed next to or included with content related to the user's update. For example, a user may select an ad to re-publish, where the ad includes an annotation which allows the user to designate one or more recipients and to re-publish the ad along with a message. The annotation may also include one or more customized information messages related to current or previous update postings. When re-published, the re-published ad can also include the annotation, allowing a subsequent recipient of the ad to further re-publish or to further comment on the re-published ad.

Figure 3:
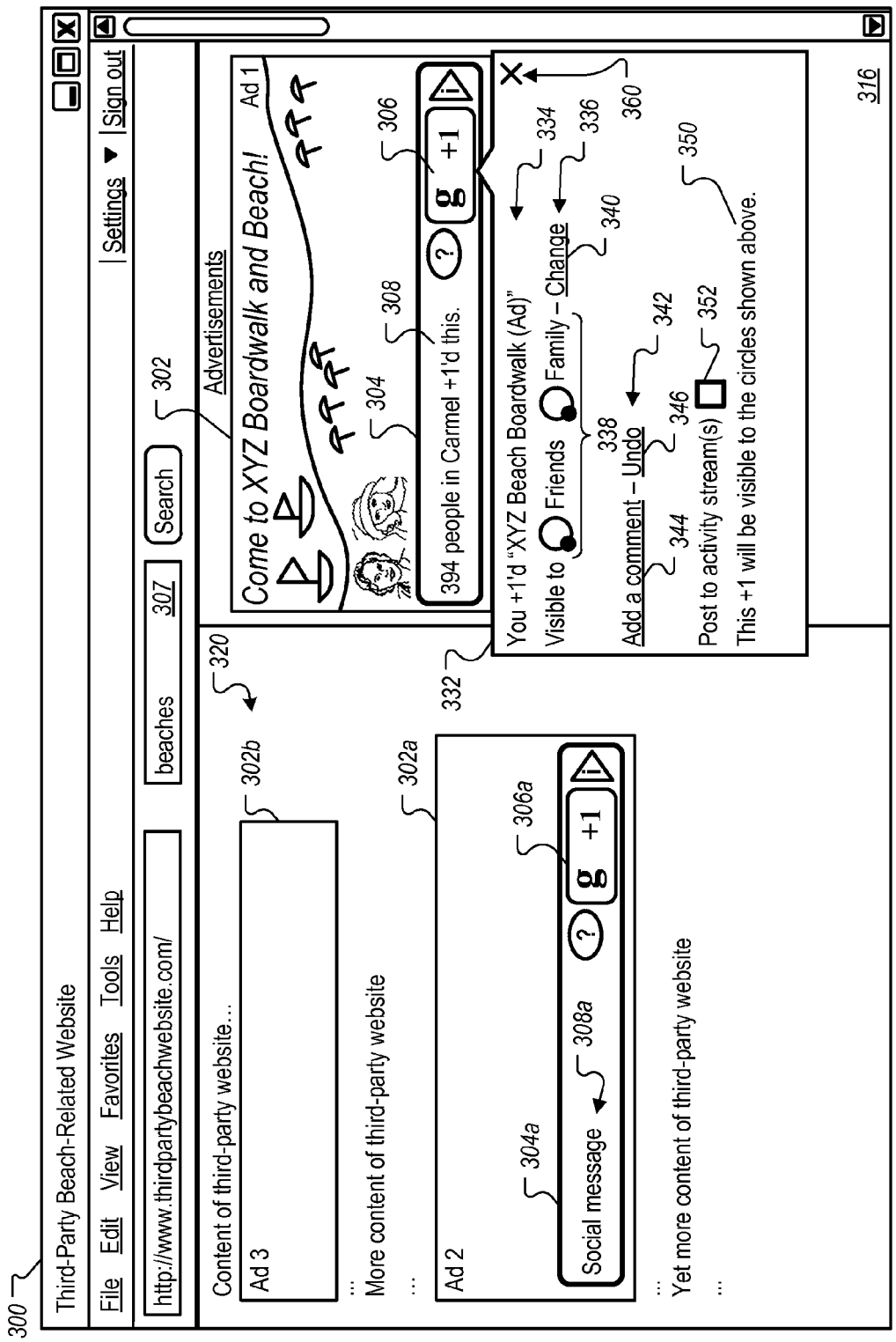
FIG. 3 shows an example user interface that includes an ad with a social overlay and a control for re-publishing the ad.

In further detail, FIG. 3 shows an example user interface 300 that includes an ad 302 with a social overlay 304 and a control 306 for re-publishing the ad 302. For example, a user can use the control 306 to re-publish the ad to one or more members of the user's groups. The user interface 300 can be provided, for example, by the ad management system 110 of FIG. 1. For example, the ad 302 can be an ad that is served with other content, such as included with search results that are responsive to a user's search query. In another example, the ad 302 can be any ad that appears on a third-party website, such as the third-party website (e.g., related to area beaches) that is displayed in the user interface 300. For example, the third-party beach-related website can be a landing page associated with one of several search results that are responsive to a search query 307 for "beaches."

The social overlay 304 can serve as an annotation that is associated with the ad 302. The annotation can include customized information related to the user and/or one or more groups that are associated with the user. For example, the social overlay 304 can annotate the ad 302 with information regarding the user's actions associated with the ad 302, or actions by members of one or more groups associated with the user (e.g., the user's circles of friends, family or other groups that are specified or inferred).

When the social overlay 304 is displayed, a social message 308 can provide any of several types of social information associated with the ad. In the example shown in FIG. 3, the social message 308 indicates that "394 people in Carmel+1'd this," meaning that 394 people in the Carmel area have "plussed one" the ad, or shared the ad with others, such as family or friends. In general, an ad being "plussed one" by a user can mean that the user is providing a positive endorsement for the ad. This example provides a summary based on geographic proximity by identifying the number of users in a certain geographic region (e.g., Carmel) who shared the ad. Other example proximity-based summaries include time-based summaries, e.g., the number of users who shared (or liked, etc.) the ad within the last hour (or some other time interval). Regional (e.g., Carmel) and other proximity-based social messages 308 can summarize actions by people who are not members of the user's groups. Other example types of information that the social message 308 can provide include the number of members in the user's groups who liked the ad, the name of a user's friend who liked the ad, and so on.

In some implementations, the social message 308 can provide statistics related to people in the user's various social groups or circles, such as the members of the user's group who had a favorable response to the advertisement. For example, the social message 308 can identify the number of the user's family members who liked the ad, or the number of people in the user's circle of friends who re-published the ad, to name a few examples. Other example social messages 308 include messages such as "Jerry, your wife +1'd this ad," "David, Roger and 4 more friends shared this ad" or "Peggy and 3 other family members shared this ad."

The ad 302 can be one of several ads that appear in an advertisements section 316 on the third-party website. Other ads 302a and 302b can appear in a content section 320 of the third-party website. For example, the ad 302a can be another ad that includes a social overlay 304a. In this example, the social overlay 304a includes a control 306a and a social message 308a that can be similar to the control 306 and social message 308 described above.

The control 306, in some implementations, can be referred to as a "plus one" control. The control 306 can be used for re-publishing or commenting upon the ad 302. The control 306 can lead to an interface from which the user can provide detailed information. For example, selecting the control 306 can result in the display of a details popup 332.

The details popup 332 can be used for providing detailed information for re-publishing an ad. The details popup 332 is just one example implementation of an interface that the user can use to provide detailed information for re-publishing an ad (e.g., re-publishing and/or commenting upon the ad 302). A header 334 can explain why the details popup 332 is displayed. In this example, the header 334 states that the user plussed-one (or shared) the "XYZ Beach Boardwalk" ad that is the subject of the ad 302, and in this case, the name of the advertiser.

The details popup 332 includes a visibility area 336 that summarizes the groups with which the user's ad re-publishing/comments are to be applied. For example, current settings 338 indicate that the user's shared information is to be visible to (and thus shared with) the user's friends and family. The user can use a change control 340 to change the visibility of the shared information, effectively changing the current settings 338.

The details popup 332 includes a commenting area 342 for adding a comment and/or removing a comment that has been associated with an ad. The commenting area 342 includes an add comment control 344 for adding a comment and an undo comment control 346 for undoing (or deleting) the added comment.

In some implementations, the user can designate that the advertisement is to be provided to a social application for presentation in an activity stream associated with the user. The advertisement and associated comments can be displayed, for example, as part of an update posted to the user's activity stream. In some implementations, the user can designate that the advertisement is to be provided to a social application for presentation as an update for the user in an activity stream associated with one or more members of a group specified by the user. For example, the advertisement and associated comments may be presented as an update to an activity stream of each member of each group specified in the current settings 338. As another example, some or all groups specified in the current settings 338 may have an associated activity stream in a social application and the advertisement and associated comments may be presented as an update to each of those activity streams.

A statement 350 that can be displayed within the details popup 332 can identify, to the user, the users (e.g., individuals, specified or inferred groups or social circles) who may be eligible to see the re-published ad. For example, the statement 350 can state, "This +1 will be visible to the circles shown above." As a result, the user can become acquainted with the mechanics and consequences of re-publishing ads that result from the selections and settings in the details popup 332, further allowing the user to understand the visibility of the ad-re-publishing. In some implementations, if the user has used the change control 340 to change the visibility to the extent that no other users currently have visibility, then the statement 350 can state, for example, "No users currently have visibility."

In some implementations, filtering or limiting of re-publication requests can occur. As a result, the mere designation by a user to re-publish to one or more groups or individuals does not necessarily mean that re-publishing will occur. For example, the designated receivers may have blocked receipt (e.g., by setting preferences in a browser to block all or selected types of social overlays on content and/or ads). In another example, some implementations of the ad management system 110 may filter re-publication requests based on one or more criteria. Example criteria include imposing limits on re-publishing, e.g., limiting the number of re-publishing events, the number of recipients, and so on. In some implementations, imposed limits on re-publishing can be applied to intervals of time, e.g., enforcing a limit of five re-published ads per day, twenty re-published ads per week, and so on. As a result, the ad management system 110 can prevent users from re-publishing too often or to too many people. Other criteria can be used for filtering re-publishing requests.

A close control 360 can be used to exit the details popup 332 and save the current settings and inputs. In some implementations, a cancel control can exist that can allow the user to exit the details popup 332 without saving any changes, essentially restoring the values of the details popup 332 to their original settings (e.g., before the user displayed the popup).

In some implementation, the details popup 332 can include an option to un-plus the ad, or to cancel the act of re-publishing the ad with others. For example, if the user changes his mind about re-publishing the ad with family and friends, or decides not to share his comments, the user can select an un-plus option (not shown in FIG. 3), e.g., somewhere inside the details popup 332. In some implementations, selecting the un-plus option can make the social overlay 304 appear in a different way in order to indicate that the ad is no longer to be republished. For example, while the ad is still displayed after the user has plussed-one the ad and the message reads "You and 394 people in Carmel+1'd this," upon the user un-plussing the ad, the message can return to its original state, namely "394 people in Carmel+1'd this."

Returning to FIG. 2, additional content is targeted to the user based on the received user update (204). For example, the received user update can be used as a signal when determining relevant content to be provided to the user in the future. For example, one or more ads can be targeted to the user in response to a future request for ads. Ads may be targeted to a user within the social application that received the user update, or in a context outside of the social application. For example, one or more ads may be requested for one or more ad slots included on a third party web page or on a search results page viewed by the user. Ads or other content may also be targeted to one or more subscribers associated with the user.

In response to a request for ads, one or more ads may be selected. For example, referring to FIG. 1, one or more ads may be selected by the ad management system 110. The ad management system 110 may select ads based on a quality score, where the quality score for an ad indicates, for example, the relevance of the ad to a received request for an ad. The quality score may be affected by one or more signals, such as one or more social signals, that are based on the received user update.

In some implementations, a social signal for a user may be based at least in part on tracked data associated with designations of updates in a social context for the user (e.g., one example social update may be an ad that is re-published in an activity stream associated with the user). For example, for each update, the social server 111 (or another system) can track the content of the update, a date and time of designation, any recipients designated to receive the update, context associated with the update and the location of the user at the time of designation (e.g., as determined by a location detection device (e.g., GPS (Global Positioning Satellite) receiver)). Social updates are described in greater detail below with reference to FIG. 4.

If the update is a designation of an ad for re-publishing, the ad management system 110 can track, for each ad designated for re-publishing by the user, an identifier of the ad, targeting keywords associated with the ad, the URL of the page that hosted the original ad designated for re-publishing or its associated landing page, and whether the hosting web page is a search results web page. If the hosting web page is a search results web page, search keywords used for the search associated with the search results web page can be tracked. Browsing history information which indicates how a user navigated to the hosting web page can be tracked, and content keywords of the including web page can be tracked. As described in more detail below, targeting can be based on some or all of the tracked data.

Additional information can be derived from tracked data, and targeting can be based on the derived information. For example, one or more rates of re-publishing can be determined for a user, such as how often a user re-publishes updates in a given time period, or, for example, for updates that are re-publications of ads, how often a user re-publishes ads having certain targeting keywords in a given time period. For example, it can be determined that a user re-publishes five ads for sports cars, on average, per month. As another example, one or more rates of re-publishing to other users or groups can be determined. For example, for each user or group a user re-publishes updates to, a rate of re-publishing can be determined. For example, it can be determined that a user re-publishes, on average three updates per week to a particular, other user, or that the user re-publishes, on average, six updates per month to a particular group. If a user frequently (e.g., at more than a threshold rate) re-publishes updates to a same set of individual users, a social group including those users can be inferred, even if those users are not otherwise included in a specified group.

Targeting of additional content to the user may be based on the tracked data and/or on information derived from the tracked data. For example, if a user has designated for re-publishing ads having certain targeting keywords, other ads having the same or similar targeting keywords can be targeted to the user in the future. As a more particular example, if the user has designated for re-publishing ads having a certain targeting keyword more than a threshold number of times within a certain time period, then other ads having that targeting keyword can be selected for presentation to the user. For instance, if the user has designated for re-publishing more than five ads for sporting equipment within the past month, other ads for sporting equipment may be presented to the user in the future.

Targeting of additional content to the user may be based on the content of the received user update. For example, the received user update may include textual content, such as a comment. The textual content can be evaluated to identify one or more topics. Additional content related to some or all of the topics can be targeted to the user in the future. For example, if a user posts a comment on an activity stream such as "the Minnesota Vikings played great yesterday", then the phrases "Minnesota", "Minnesota Vikings" and other phrases can be evaluated and topics can be identified, such as the state of Minnesota, the Minnesota Vikings football team, the National Football league, football in general, sports in general, or other topics. Additional content (e.g., ads) relating to one or more of the identified topics (e.g., ads relating to football) can be selected and can be targeted to the user in the future.

Targeting of additional content to a user may be based on previous social activity of the user. For example, targeting of additional content may be based on who has been designated as recipients of re-published updates. In some implementations, if a first user has re-published updates related to a particular topic or having particular targeting keywords to a second user, ads relating to that topic or having those targeting keywords may be targeted in the future to both the first user and the second user. For example, it may be assumed that it is likely that both the first user and the second user have an interest in content related to the targeting keywords. As a particular example, if the first user designates an update related to sporting equipment for re-publishing to the second user, ads related to sporting equipment can be targeted to both the first user and the second user in the future.

It may also be assumed that it is likely that the first user and the second user share at least some other, common interests, and that that the first user may be generally interested in content that the second user is interested in. Therefore, for example, ads that have been previously designated for re-publishing by the second user may be selected for re-publishing to the first user, even if the second user did not explicitly designate the first user when designating the ads for re-publishing. As another example, other ads that the first user designated for re-publishing but that were not designated at that time to be received by the second user, can in the future be targeted to the second user, based on the assumption that the first user and the second user share some common interests.

If content (e.g., ad or other update) is targeted to the second user based on a previous designation for re-publishing of an update by the first user, the content may, when presented to the second user, include a custom annotation. For example, an annotation of content presented to "Tom" may indicate that "Bob likes this". As another example, content targeted to a given user may include a custom annotation which indicates how many users that are members of a group associated with the user have previously designated the content for re-publishing. For example, content presented to "Tom" may include a custom annotation of "Five of your friends like this".

Targeting of additional content may be based on other context associated with the designation of an update for re-publishing. For example, a user may tend to designate updates (e.g., re-publication of ads having a particular topic or particular targeting keywords, or other kinds of updates) at certain times of day or times of year. For example, a trend of a user designating vacation ads for re-publishing during the month of June can be determined and other vacation ads can be targeted to the user during the month of June in future years. As another example, a user may tend to designate theater ads for re-publishing on Friday afternoons, and other theater or other entertainment-related ads can be targeted to the user on Friday afternoons in future weeks. As yet another example, a user may tend to make social updates that relate to football on Mondays, and content (e.g., ads) relating to football or that may be associated with football fans can be targeted to the user on Mondays.

Targeting of content may be based on a user's location. For example, if a user tends to designate content for re-publishing while at a particular location (e.g., in a particular city, at a particular address), then content associated with that location can be targeted to the user. In some implementations, content associated with a location can be generally targeted to the user regardless of the user's current location, and in other implementations content associated with the location can be targeted to the user when the user is at the location. In some implementations, if the user is at a particular location, such as a location not previously associated with the user, then ads associated with that location that have been previously designated for re-publishing by other users (e.g., users not otherwise associated with the user) can be targeted to the user, while the user is at the location. For example, if a user who lives in Chicago travels to New York, ads associated with New York that have been previously designated by other users for re-publishing can be presented to the user while the user is in New York.

In addition to tracking the designation of a content item for re-republishing, user interactions with an update posting that is presented in an activity stream can be tracked, and additional content can be targeted to the user or to a group associated with the user based on the interactions. An update may be posted to an activity stream, for example, based on a designation by a user. For example, an update may be posted to an activity stream associated with the user or an activity stream associated with one or more members of a group specified by the user.

The user or a member of a group specified by the user can interact with the update posting, such as to designate either liking or disliking the posting. As another example, if the update posting is a re-published ad, the user or a member of a group specified by the user can select the ad, such as to expand the ad or to navigate to a landing page associated with the ad. As yet another example, the user can enter a comment associated with the update posting. Interacting with an update posting in an activity stream can indicate interest in content related to a topic associated with the update posting. Therefore, additional content (e.g., ads) related to the content of the update posting can be presented to the user in the future, based on tracked interactions.

If multiple users interact with an update posted to an activity stream (e.g., if multiple users comment on the posting), then additional content related to the content of the update can be targeted to each of the users. For example, if a first user posts an update about tennis, and if second and third users comment on the update, then content (e.g., ads) related to tennis can be targeted to each of the first, second, and third users. As another example, if the first user frequently (e.g., at more than a threshold rate) interacts with updates posted to an activity stream by the second user, then it can be inferred that a relationship exists between the first user and the second user and that they may share common interests. Consequently, any or all content targeted to either the first user or the second user may also be targeted to the other user.

In some implementations, the age of tracked data can affect whether content is targeted to a user. For example, one or more ads having particular targeting keywords may be selected to be presented to the user if the user has re-published related updates (e.g., re-publication of other ads having those or similar targeting keywords) within a predetermined time period (e.g., the past month). In this example, if the last time the user posted related updates was three months ago, related content might not be selected for presentation to the user. As another example, more recent tracked data may be given higher weight than older tracked data when determining a relevancy of tracked data. For example, tracked data for updates posted within the past month may be given a weight of 100%, tracked data for updates posted between one month and three months from the current date may be given a weight of 60%, and tracked data for updates posted more than three months from the current date may be given a weight of 0%.

In addition to targeting additional content to a user, additional content can be targeted to one or more groups associated with the user. For example, if the user designates a group as a recipient for a content update, then it can be assumed that members of the group share common interests with the user, and other content (e.g., ads) relating to the topic of the update can be targeted to the group or to each member of the group in the future. As mentioned above, if a user frequently (e.g., at more than a threshold rate) provides updates to a same set of individual users, a social group including those users can be inferred, even if those users are not otherwise included in a specified group. Additional content similar to the updates provided to the set of users can be presented in the future to each of the users in the inferred social group.

Other targeting activities can occur in response to the received user update other than selecting content for presentation to the user. For example, and as mentioned, an annotation included in an update can be customized, such as to include a comment entered by the user or to indicate who or how many people have designated the content for re-publishing. As another example, the user and/or one or more members of groups associated with the user may be surfaced to one or more advertisers.

Figure 4:
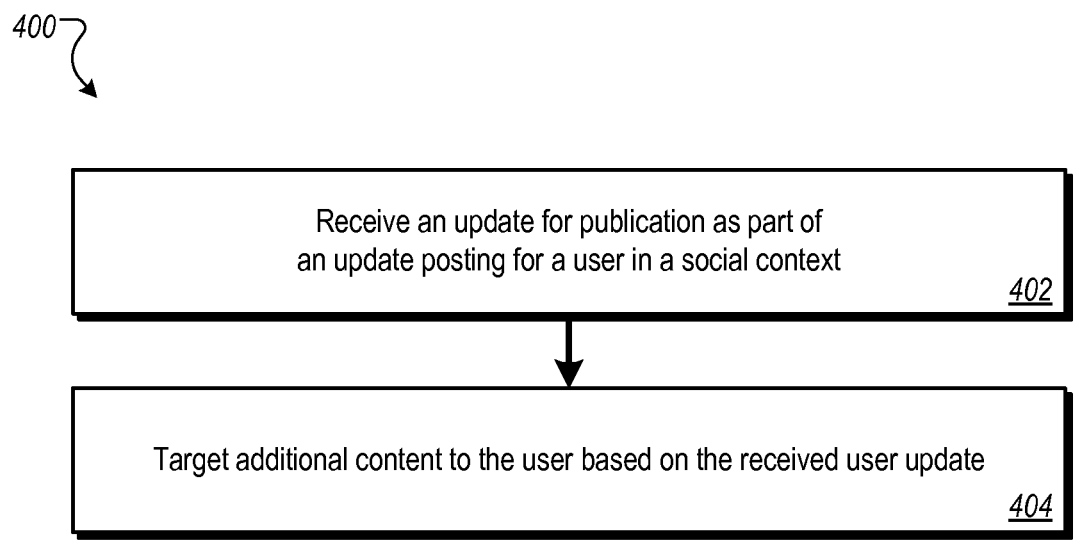
FIG. 4 is a flowchart of an example process for targeting content to a user based on an update posted for a user in a social context.

FIG. 4 is a flowchart of an example process 400 for targeting content to a user or a group associated with the user based on an update that is received for publication in a social context. The process 400 can be performed, for example, by the ad management system 110 and/or by the social server system 111.

An update for publication is received as part of an update posting for a user in a social context (402), where the social context is related to a social application executing on one or more servers, and the social application includes a presence associated with the user for providing updates about the user to one or more subscribers. The update can include textual and/or multi-media content and can be a comment by a user on content exposed to the user by the social application, a comment posted by the user on a blog, an interaction with a content item in a user's activity stream, a designation of an advertisement for re-publication by the user, or a designation that a user likes, approves, agrees, supports or dislikes certain content, to name a few examples.

The update can include an indication to publish the update to an individual or group designated by the user. For example, the user may use a control to designate the update for publishing and to select one or more recipients of the update. A recipient can be, for example, one or more individuals and/or one or more groups such as a social circle, family, friends, work groups, or any other particularly identified group. The control can be included, for example, in an annotation that is displayed next to or included with content related to the user's update. For example, a user may select an ad to re-publish, where the ad includes an annotation which allows the user to designate one or more recipients and to re-publish the ad along with a message. The annotation may also include one or more customized information messages related to current or previous update postings. When re-published, the re-published ad can also include the annotation, allowing a subsequent recipient of the ad to further re-publish or to further comment on the re-published ad.

Additional content is targeted to the user based on the received user update (404). For example, and similar to the targeting described above, one or more ads can be targeted to the user, such as within the social application or in a context outside of the social application. Targeting can be based at least in part on the content of the update, on tracked interactions of updates, on who the user has designated updates to, on the location of the user, on the timing of updates, on specified or inferred relationships between the user and/or groups associated with the user, on the age of tracked data, or on how often a user updates, to name a few examples.

Figure 5:
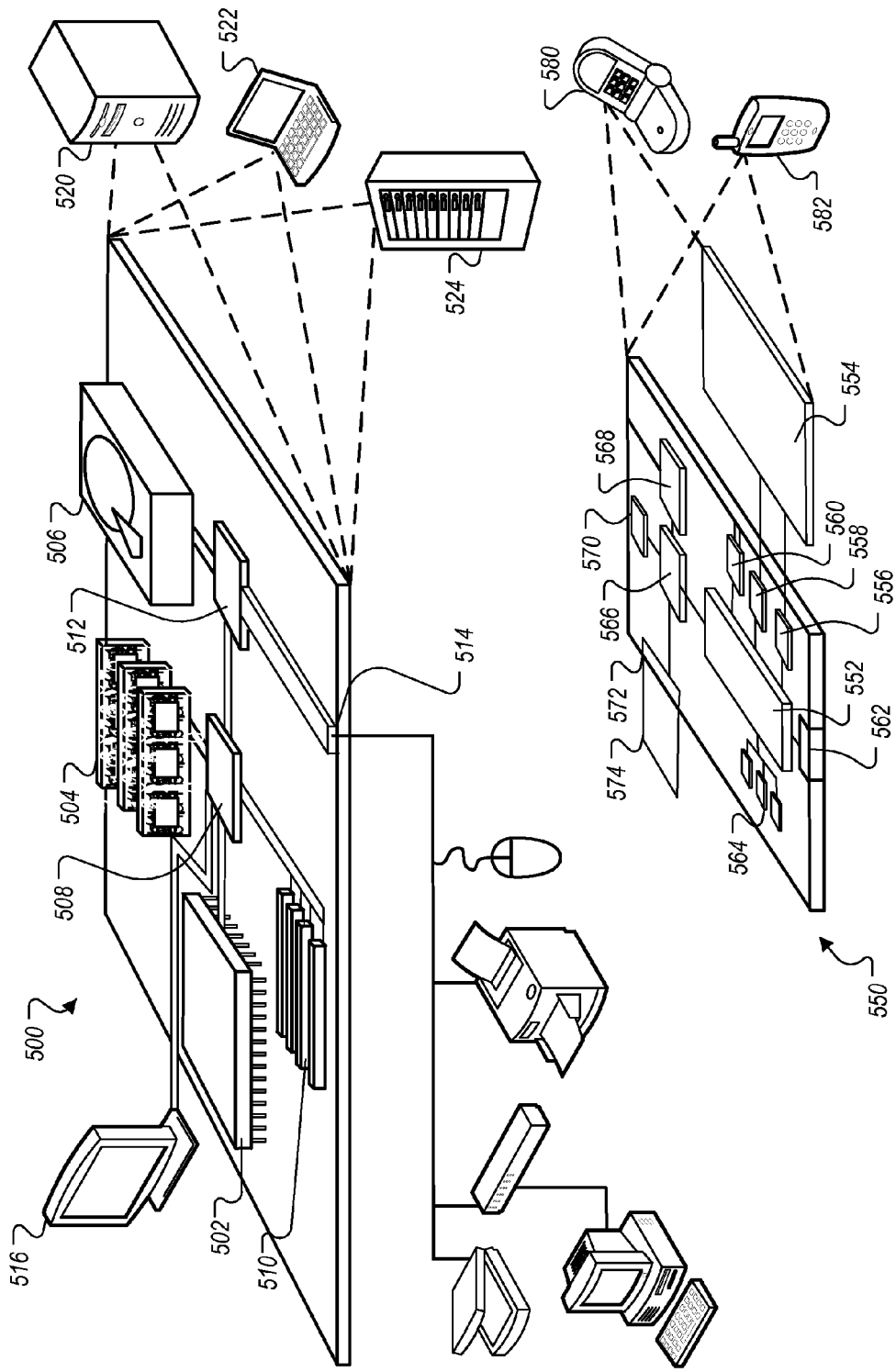
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in a non-transitory information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   receiving, by one or more processing devices, an update for publication to an activity stream associated with a first user, the activity stream being produced by a social application executing on one or more server computers and being published for consumption by one or more subscribers to the social application that have been designated by the first user as being authorized to receive the update, the update comprising a republication of content from a second user of the social application; and distributing, by the one or more processing devices and based on the update, additional content for display on a computing device of the second user, the additional content distributed to the second user comprising one or more republications of updates from the first user that were not, prior to receiving the update, designated for republication to the second user.

2. The method of claim 1, wherein the activity stream is a stream produced by the social application.

3. The method of claim 1, wherein the update includes content for publication in the activity stream and where distributing includes distributing additional content based on the content for publication.

4. The method of claim 1, wherein distributing includes distributing additional content to one or more of the subscribers.

5. The method of claim 1, wherein distributing includes distributing advertisements to serve to the first user in one or more contexts.

6. The method of claim 5, wherein the one or more contexts include within the social application.

7. The method of claim 5, wherein the one or more contexts includes a context outside of the social application that received the user update.

8. The method of claim 1, wherein the update further comprises content selected from the group comprising a comment by a user on content exposed to the user by the social application, a comment posted by the user on a blog, an interaction with a content item in a user's activity stream, a designation of an advertisement for re-publication by the user, or a designation that a user likes, supports, approves or dislikes certain content.

9. The method of claim 1, further comprising
(a) receiving an indication from the first user to publish the update to an individual or group designated by the first user;
(b) determining information to be included in an annotation to be published along with the update, the annotation including customized information related to a user or a group associated with the first user that is to be presented along with the update; and
(c) providing the update to the individual or group including providing the annotation along with the update.

10. The method of claim 9, wherein the annotation includes a control for re-publishing the update by a recipient.

11. The method of claim 10, further comprising receiving user input selecting the control and designating the update for republishing.

12. The method of claim 9, further comprising distributing additional content to a user or a group associated with the first user based on the indication.

13. The method of claim 9, further comprising tracking designations to whom a user republishes updates to and distributing additional content to the user or group associated with the first user based on the tracking.

14. The method of claim 9, further comprising tracking designations for how often the first user republishes updates and distributing additional content to the user or group associated with the first user based on the tracking.

15. The method of claim 9, further comprising tracking where the first user is located or a time of designation for designations to republish an update and distributing additional content to the user or group associated with the first user based on the tracking.

16. The method of claim 9, further comprising tracking a context associated with the first user when making a designation to republish an update and distributing additional content to the user or group associated with the first user based on the tracking.

17. The method of claim 9, further comprising to tracking whom the first user designates updates to be republished so as to infer relationships between the first user and the designates and distributing additional content to the user or group associated with the first user based on the tracking.

18. The method of claim 9, wherein the group is a social circle.

19. The method of claim 9, wherein the group is selected from groups comprising a social circle, family, friends, work groups, or other particularly identified groups.

20. The method of claim 12, wherein the control enables a user to republish the update along with a message.

21. The method of claim 1, wherein distributing includes using occurrence of the update when determining relevant content to be provided to the first user in the future.

22. The method of claim 1, further comprising determining one or more social signals for use in affecting a quality score that is used to evaluate content to be provided to the first user, where the one or more social signals are based at least in part on the update.

23. The method of claim 22, further comprising determining one or more social signals based at least in part on the update and using the one or more social signals when determining content for presentation to the first user.

24. The method of claim 23, where the one or more social signals are used to categorize the first user as belonging to a group.

25. The method of claim 23, wherein the one or more social signals are used to customize annotations to be included with updates that are republished by the first user.

26. The method of claim 23, wherein the one or more social signals are used to determine whether a system that republishes content should re-publish other content to the first user.

27. The method of claim 23, wherein the one or more social signals are used to identify the first user to an advertiser.

28. One or more non-transitory machine-readable storage media storing instructions that, when executed by a processor, cause the processor to perform operation comprising:
receiving an update for publication to an activity stream associated with a first user, the activity stream being produced by a social application executing on one or more server computers and being published for consumption by one or more subscribers to the social application that have been designated by the first user as being authorized to receive the update, the update comprising a republican of content from a second user of the social application; and
distributing, based on the update, additional content for display on a computing device of the second user, the additional content distributed to the second user comprising one or more republications of updates from the first user that were not, prior to receiving the update, designated for republication to the second user.

29. A system comprising:
memory storing instructions that are executable; and
one or more processing devices to execute the instructions to perform operations comprising:
receiving an update for publication to an activity stream associated with a first user, the activity stream being produced by a social application executing on one or more server computers and being published for consumption by one or more subscribers to the social application that have been designated by the first user as being authorized to receive the update, the update comprising a republication of content from a second user of the social application; and distributing, based on the update, additional content for display on a computing device of the second user, the additional content distributed to the second user comprising one or more republications of updates from the first user that were not, prior to receiving the update, designated for republication to the second user.

30. The method of claim 1, wherein further content is distributed to at least the first user based on distribution criteria relating to the content.

31. The one or more non-transitory machine-readable storage media of claim 28, wherein further content is distributed to at least the first user also on distribution criteria relating to the content.

32. The system of claim 29, wherein further content is distributed to at least the first user also on distribution criteria relating to the content.

* * * * *